United States Patent
Florimond (10) Patent No.: US 11,282,392 B2
(45) Date of Patent: Mar. 22, 2022

(54) METHOD FOR MONITORING AN ENVIRONMENT OF A PARKED MOTOR VEHICLE COMPRISING AN ASYNCHRONOUS CAMERA

(71) Applicant: RENAULT s.a.s., Boulogne-Billancourt (FR)

(72) Inventor: Charles Florimond, Les Clayes sous Bois (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 16/970,159

(22) PCT Filed: Jan. 14, 2019

(86) PCT No.: PCT/EP2019/050754
§ 371 (c)(1),
(2) Date: Aug. 14, 2020

(87) PCT Pub. No.: WO2019/158287
PCT Pub. Date: Aug. 22, 2019

(65) Prior Publication Data
US 2021/0065554 A1    Mar. 4, 2021

(30) Foreign Application Priority Data
Feb. 16, 2018 (FR) ..................... 1851322

(51) Int. Cl.
*B60R 25/30* (2013.01)
*G08G 1/16* (2006.01)
(Continued)

(52) U.S. Cl.
CPC ........... *G08G 1/168* (2013.01); *B60R 25/102* (2013.01); *B60R 25/1012* (2013.01);
(Continued)

(58) Field of Classification Search
CPC .... G08G 1/168; G08G 1/162; B60R 25/1012; B60R 25/102; B60R 25/305; B60R 25/31
See application file for complete search history.

(56) References Cited

U.S. PATENT DOCUMENTS

| 5,844,517 A * | 12/1998 | Lambropoulos ... G07C 9/00309 341/176 |
| 6,958,682 B2 * | 10/2005 | Lefaure .................. B60R 25/245 340/426.36 |

(Continued)

FOREIGN PATENT DOCUMENTS

| JP | 2005-39705 A | 2/2005 |
| JP | 2009-141456 A | 6/2009 |

(Continued)

OTHER PUBLICATIONS

International Search Report dated Apr. 11, 2019 in PCT/EP2019/050754 filed on Jan. 14, 2019, 2 pages.

(Continued)

*Primary Examiner* — Nay Tun
(74) *Attorney, Agent, or Firm* — Oblon, McClelland, Maier & Neustadt, L.L.P.

(57) ABSTRACT

A method monitors an environment of a parked motor vehicle that includes an engine, a computer and a monitoring system including an asynchronous camera. The monitoring method includes: a parked vehicle detection step in which the monitoring system detects that the vehicle is parked and the engine is stopped; a movement detection step in which the monitoring system detects if an object is moving in the vehicle environment by movement detection via the asynchronous camera; and a step of waking up the computer in which the monitoring system wakes up the computer.

10 Claims, 3 Drawing Sheets

(51) Int. Cl.
  *B60R 25/10* (2013.01)
  *B60R 25/102* (2013.01)
  *B60R 25/31* (2013.01)

(52) U.S. Cl.
  CPC ............ *B60R 25/305* (2013.01); *B60R 25/31* (2013.01); *G08G 1/162* (2013.01)

(56) References Cited

U.S. PATENT DOCUMENTS

| | | | |
|---|---|---|---|
| 6,993,157 B1 * | 1/2006 | Oue ..................... | G06T 7/251 382/103 |
| 7,307,655 B1 * | 12/2007 | Okamoto ........... | G06K 9/00791 348/222.1 |
| 7,528,704 B2 * | 5/2009 | Das ..................... | B60R 21/013 296/146.1 |
| 2006/0254142 A1 | 11/2006 | Das et al. | |
| 2007/0182526 A1 * | 8/2007 | Horii ................ | B60R 25/1004 340/426.1 |
| 2007/0204684 A1 * | 9/2007 | Muhlhoff ........... | G01B 11/165 73/146 |
| 2015/0109446 A1 * | 4/2015 | Takano ............... | H04N 7/18 348/148 |
| 2015/0287326 A1 * | 10/2015 | Weller ................ | H04N 7/181 348/148 |
| 2016/0093273 A1 * | 3/2016 | Wang .................. | G01S 3/781 345/428 |
| 2016/0357262 A1 * | 12/2016 | Ansari ............ | G06Q 10/0833 |
| 2017/0214852 A1 * | 7/2017 | Yoon ................ | H04N 5/232933 |
| 2018/0079388 A1 * | 3/2018 | Andrews ............ | B60R 25/102 |
| 2019/0080313 A1 * | 3/2019 | Van Wiemeersch ......... | B62D 15/027 |
| 2019/0265038 A1 * | 8/2019 | Ashbrook ............ | G01S 17/89 |
| 2019/0379864 A1 * | 12/2019 | Zhang ................ | B60R 25/31 |

FOREIGN PATENT DOCUMENTS

| | | |
|---|---|---|
| WO | WO 2004/071815 A1 | 8/2004 |
| WO | WO 2009/104215 A2 | 8/2009 |
| WO | WO 2017/105913 A1 | 6/2017 |

OTHER PUBLICATIONS

French Preliminary Search Report dated Oct. 12, 2018 in French Application 1851322 filed on Feb. 16, 2018, 2 pages.

\* cited by examiner

METHOD FOR MONITORING AN ENVIRONMENT OF A PARKED MOTOR VEHICLE COMPRISING AN ASYNCHRONOUS CAMERA

The invention relates to the field of motor vehicles, in particular the monitoring of the environment of the vehicle, when the vehicle is parked, with its engine stopped.

The invention relates to a method for monitoring an environment of a parked motor vehicle. The invention relates also to a computer program and an associated readable information medium.

It is known practice to place synchronous cameras in motor vehicles for driving assistance. A synchronous camera operates generally in the gray level and its operation is based on the regular taking of photographs according to a predefined frequency.

These synchronous cameras are active in the vehicle running phase but are generally deactivated when the vehicle is parked. It is not possible to consider leaving them activated for several days when the vehicle is parked because their electrical consumption is too high, the vehicle battery would be discharged very quickly and that would mean that the user of the vehicle would be unable to restart the vehicle. Thus, it is not currently possible to monitor the environment of the vehicle by the vehicle itself, when the vehicle is parked for several days.

The invention aims to resolve this problem by using an asynchronous camera which is, as is known, used primarily in the medical field, but also in industrial applications that require ultra-fast motion detection.

The asynchronous camera is a dynamic camera whose optical sensor is composed of a matrix of mutually independent pixels. A motion in the field of view of the asynchronous camera provokes a change of intensity on the corresponding pixel or pixels. The consumption of the asynchronous camera is a function of the number of pixels for which the intensity varies. Thus, an asynchronous camera has a low consumption in a static environment.

The invention uses this property of low consumption of the asynchronous camera to advantageously apply it to the monitoring of an environment of a parked motor vehicle.

The invention relates to a method for monitoring an environment of a parked motor vehicle, the vehicle comprising an engine, a computer and a monitoring system comprising an asynchronous camera, the monitoring method comprising the following steps:
  a parked vehicle detection step wherein the monitoring system detects that the vehicle is parked, its engine being stopped,
  a motion detection step wherein the monitoring system detects whether an object is moving in the vehicle environment by means of a motion detection by the asynchronous camera,
  a computer wake-up step wherein the monitoring system wakes up said computer.

According to an aspect of the invention, the monitoring method also comprises an alert step wherein the monitoring system sends an alert signal to an electronic device by means of a wireless communication.

According to an aspect of the invention, the computer is chosen from:
  a vehicle lighting computer,
  a sound warning computer,
  a vehicle openings computer,
  a vehicle alarm computer,
  an obstacle detection computer,
  a video recording computer,
  a danger warning computer,
  a vehicle geolocation computer,
  a braking computer.

According to an aspect of the invention, the vehicle is associated with an identification badge, the monitoring method also comprises an identification badge detection step, said computer is a vehicle openings computer.

According to an aspect of the invention, the monitoring method also comprises a step of recognition of a motion of the moving object from among predefined movements.

According to an aspect of the invention, the monitoring method also comprises a step of detection of a nighttime lighting request signal, the computer is a vehicle lighting computer.

According to an aspect of the invention, the monitoring method also comprises a step of detection of a door opening request, the computer is a danger warning computer.

According to an aspect of the invention, the motor vehicle is parked on a parking surface substantially defining a parking plane, an optic of the asynchronous camera is oriented toward the parking plane.

According to an aspect of the invention, the monitoring method also comprises a step of placing the computer on standby wherein the monitoring system places said computer on standby after a predetermined wake-up time of said computer or a predetermined time of non-detection of a moving object in the vehicle environment has elapsed.

According to an aspect of the invention, the monitoring system also comprising a synchronous camera, the motion detection step comprising the following operations:
  a motion detection operation wherein the asynchronous camera detects a movement in the vehicle environment,
  a synchronous camera activation operation,
  a determination operation wherein the monitoring system determines whether a relevant object is moving in the vehicle environment, as a function of acquisition data from the synchronous camera and from the asynchronous camera.

The invention relates also to a computer program product comprising program instructions implementing at least one step of the monitoring method, when the program instructions are executed by a computer.

The invention relates also to a readable information medium on which is stored the computer program product.

Other advantages and features will become apparent on reading the following description and of embodiments, given purely by way of example and with reference to the drawings which are.

The invention relates to the monitoring of the environment of a motorized vehicle, typically a motor vehicle, when the vehicle is parked, its engine being stopped, in particular to a monitoring method.

A parked vehicle is a vehicle that is parked, for example on a public or private parking space, in the road, in a garage of a private property, in a public car park, at the curb of a road, along a pavement or all or partly on a pavement. A vehicle stopped at a red light, a stop sign or on a busy road is not a parked vehicle within the meaning of the invention, even if its engine is stopped. In this case, the vehicle is not considered to be parked.

The vehicle environment as defined in the invention comprises the interior environment of the motor vehicle, that is to say the cabin of the vehicle and the vehicle loading space, and the outside of the vehicle. The outside of the vehicle comprises the ground on which the vehicle is parked, a person, a moving vehicle, an animal.

In the following description, the parked vehicle comprising the monitoring device is called: vehicle or vehicle of the invention.

A vehicle distinct from the vehicle of the invention which is a moving object within the meaning of the invention is called: moving vehicle.

The vehicle environment corresponds to a field of view of the asynchronous camera of approximately 100 meters.

The scope of the monitoring targeted by the invention comprises:
the protection of the vehicle against vandalism, theft outside the vehicle or inside the vehicle, the interior of the vehicle comprising the cabin and the loading space of the vehicle,
the protection of the vehicle against impacts and accidents,
the protection of pedestrians and of moving vehicles against impacts and accidents,
driver or passenger assistance comprising control of the openings of the vehicle,
driver or passenger assistance for lighting of the environment of the vehicle,
vehicle lighting signaling at night,
vehicle owner alert, formation of evidence.

The possible applications of the monitoring method comprise:
theft inside the vehicle,
preventive protection of the vehicle bodywork,
surveillance video,
vehicle theft,
locking and unlocking of the locks of the openings,
mechanical opening of the openings,
opening and closing of the motorized openings,
vehicle movement prevention,
vehicle slip prevention,
vehicle signaling at night,
secured vehicle exit,
lighting of the environment outside the vehicle at night.

The vehicle comprises an engine, a computer and a monitoring system comprising an asynchronous camera.

Figure 1:
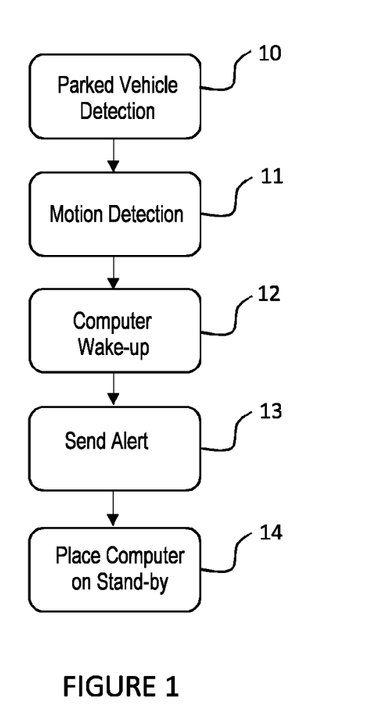
FIG. 1, a schematic representation of the monitoring method according to the invention, FIG. 2, a schematic representation of operations of one of the steps of the monitoring method of the invention in an advanced embodiment, FIG. 3, a schematic representation of the steps of the monitoring method in the cases of locking or unlocking, door opening or closing applications, FIG. 4, a schematic representation of the steps of the monitoring method of FIG. 3, in a basic embodiment, FIG. 5, a schematic representation of the steps of the monitoring method in the case of a vehicle signaling application at night, FIG. 6, a schematic representation of the steps of the monitoring method in the case of a secured vehicle exit application.

According to FIG. 1, the monitoring method comprises the following steps:
a parked vehicle detection step 10 wherein the monitoring system detects that the vehicle is parked, the engine being stopped,
a motion detection step 11 wherein the monitoring system detects whether an object is moving in the vehicle environment by means of a motion detection by the asynchronous camera,
a computer wake-up step 12 wherein the monitoring system wakes up said computer,
an alert step 13 wherein the monitoring system sends an alert signal to an electronic device by means of a wireless communication,
a step of placing the computer on standby 14 wherein the monitoring system places said computer on standby after a predetermined wake-up time of said computer or a predetermined time of non-detection of a moving object in the vehicle environment has elapsed.

In the parked vehicle detection step 10, the monitoring system detects that the vehicle is parked, the engine being stopped.

The detection of a parked vehicle, with engine stopped, can for example be performed by the observation of parameters of the vehicle: the speed of the wheels, the state of the engine, the state of the openings. This observation can be performed by an observation member of the vehicle which sends a signal or several signals to the monitoring system. Through the reception and possible decoding of this signal or of these signals, the monitoring system detects that the vehicle is parked and that the engine of the vehicle is stopped.

The signals relating to the speed of the wheels, the state of the engine or the state of the openings can originate from information transmitted by a vehicle communication network of LIN, CAN or Ethernet type.

The monitoring system can also comprise means capable of performing this observation of vehicle parameters in order to allow this detection of a parked vehicle, with engine stopped.

After the system has detected that the vehicle is parked, the engine being stopped, most of the members of the vehicle are on standby. The computer is on standby. The monitoring system is active. The asynchronous camera is active. If the vehicle comprises other cameras, they are on standby.

In the motion detection step 11, the monitoring system detects whether an object is moving in the vehicle environment by means of a motion detection by the asynchronous camera whose field of view scans the vehicle environment.

The moving object targeted by the invention can comprise a moving vehicle, an animal, an individual, the gesture of an individual, the ground on which the vehicle is parked.

In a first embodiment, called basic embodiment, the motion detection is performed by the asynchronous camera alone, that is to say not associated with an optical device of another type, for example a synchronous camera.

The asynchronous camera detects a movement when one or more of the pixels of the image change intensity.

The asynchronous camera can comprise an electronic circuit comprising an image processing filter. This processing filter notably makes it possible to avoid false motion detections in the case of a non-relevant moving object or in the case of objects too far away, and therefore not relevant for the application that is targeted.

Figure 2:
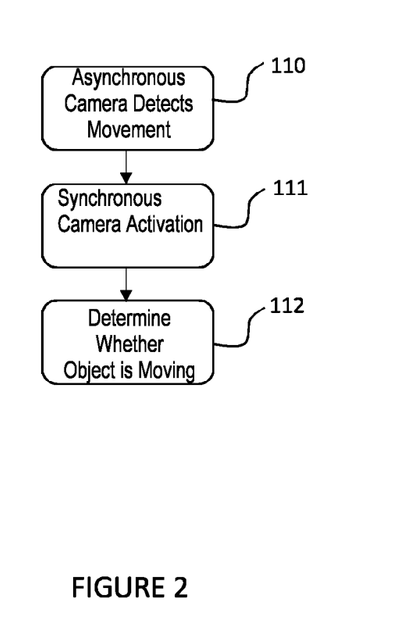

In a second embodiment, called advanced embodiment, the monitoring system also comprises a synchronous camera. This embodiment is represented in FIG. 2 and is detailed later in the description.

In the computer wake-up step 12, the monitoring system wakes up said computer.

The computer which is woken up on the computer wake-up step 12 is chosen from among a computer or a combination of computers from the following list:
a vehicle lighting computer,
a sound warning computer, a vehicle openings computer,
a vehicle alarm computer,
an obstacle detection computer,
a video recording computer,
a danger warning computer,
a vehicle geolocation computer,
a braking computer.

The waking up of the vehicle lighting computer activates one or more of the lights of the vehicle such as the main beams, the dipped beams, the low beams, the stop lights, the flashing indicators or interior lighting of the vehicle.

The waking up of the sound warning computer activates a sound warning device of the vehicle that is audible from the outside of the vehicle, for example the horn of the vehicle.

The waking up of the vehicle openings computer activates one of the following functions:
  the locking or the unlocking of the locks openings,
  the opening of mechanical openings, the opening maneuver being performed then by an elastic mechanical system, for example a spring,
  the opening or the closing of motorized openings of the vehicle.

The openings of the vehicle comprise the doors, the hood, the trunk lid, the tailgate, the fuel cap, the charging cap of an electric or hybrid vehicle, the opening roof of the vehicle, the roof of a convertible.

The waking up of the vehicle alarm computer activates a vehicle alarm, this making it possible to dissuade an individual from stealing or vandalizing the vehicle. The vehicle alarm can be a sound or light alarm. The vehicle alarm can be coupled with the sending of a message, notably a text or video message on a cellphone, for example to the owner of the vehicle, to the usual driver of the vehicle or to a monitoring company.

The waking up of the optical detection computer activates sensors used notably for parking assistance, in particular the ultrasound sensors. The activation of the sensors can relate, for example, to all the ultrasound sensors located at the rear or the front of the vehicle or on the sides of the vehicle depending on the placement of the moving object in the vehicle environment. The obstacle detection can be coupled with the transmission of a sound or light signal.

The waking up of the video recording computer activates a video recording for example by means of a synchronous camera.

The waking up of the danger warning computer activates the transmission of a signal which can be:
  a light signal, for example on the dashboard of the vehicle or on an opening of the vehicle,
  a sound signal that can be identified by the user of the vehicle as being a signal warning of a potential danger,
  an alert signal to an electronic device by means of a wireless communication.

The waking up of the vehicle geolocation computer activates the geolocator of the vehicle, making it possible to identify the coordinates of the vehicle, for example its latitude and its longitude.

The waking up of the braking computer activates the parking brake of the vehicle, making it possible to tighten or loosen the automatic parking brake of the vehicle.

The alert step 13 is optional. The monitoring system sends an alert signal to an electronic device by means of a wireless communication. For example, the monitoring system sends a text or video message to the cellphone of the owner of the vehicle or to a monitoring company. The coordinates, such as the latitude and the longitude of the vehicle, can also be sent.

In the step of placing the computer on standby 14, the monitoring system places said computer on standby after a predetermined wake-up time of said computer or a predetermined time of non-detection of a moving object in the vehicle environment has elapsed. That makes it possible not to discharge the battery of the vehicle too rapidly.

Preferentially, the monitoring method then continues with a return to the motion detection step 11.

The order of sequencing of the steps 10 to 14 is preferably that indicated in FIG. 1. Nevertheless, the alert step 13 can be positioned after the motion detection step 11 or the computer wake-up step 12 or concurrent with one of said steps 11, 12.

According to FIG. 2, in the advanced embodiment, the motion detection step 11 comprises the following operations:
  a motion detection operation 110 wherein the asynchronous camera detects a movement in the vehicle environment,
  a synchronous camera activation operation 111,
  a determination operation 112 wherein the monitoring system determines whether a relevant object is moving in the vehicle environment, as a function of acquisition data from the synchronous camera and from the asynchronous camera.

In the motion detection operation 110, the asynchronous camera detects a movement in the vehicle environment.

The asynchronous camera detects a movement when one or more of the pixels of the image of the asynchronous camera change intensity.

Then, in the synchronous camera activation operation 111, the asynchronous camera activates the synchronous camera. This step makes it possible to not leave the synchronous camera active throughout the time of parking of the vehicle in order to avoid discharging the battery of the vehicle. When the synchronous camera is active, it records images or data on these images.

It is finally during the determination operation 112, wherein the monitoring system compiles and processes the acquisition data from the synchronous and asynchronous cameras, that a determination is made as to whether a relevant object is moving within the meaning of the invention. If a moving relevant object is detected, the computer wake-up step 12 is executed.

During the determination operation 112, the monitoring system can notably determine:
  the nature of a moving object, for example a moving vehicle, an animal, an individual, the gesture of an individual, the ground on which the vehicle is parked,
  the motion of the moving object, for example from among predefined movements,
  the distance between the moving object and the vehicle.

Depending on the nature of the moving object and/or its movement and/or its speed and/or its distance to the vehicle, the monitoring system determines whether the moving object is relevant.

The criteria for determining a relevant object are variable, depending on the applications.

A predefined movement corresponds to a line of a movement and/or a direction of a movement and/or a speed of a movement.

For some applications, the optic of the asynchronous camera is directed toward the interior of the vehicle, notably the cabin and/or the loading space, in order to monitor the cabin of the vehicle and/or the loading space.

For other applications, the optic of the asynchronous camera is directed toward the outside environment of the vehicle, that is to say the road environment or the environment of a car park or of a garage.

The asynchronous camera can be located at the front of the vehicle or at the rear of the vehicle. It can be incorporated or not behind the windows.

The asynchronous camera can also be located on the wing mirrors or the side openings.

The asynchronous camera can also be located simultaneously at several points of the vehicle. In this case, the asynchronous camera is likened to a system of several asynchronous optical devices located at different points of the vehicle.

In the case of an application against theft inside the vehicle, the moving object is an individual detected within the vehicle cabin and/or within the loading space of the vehicle.

The optic of the asynchronous camera is directed toward the interior of the vehicle to monitor the vehicle cabin and/or the loading space.

The computer which is woken up in the computer wake-up step 12 is a vehicle alarm computer and/or a video recording computer and/or a vehicle geolocation computer.

In the case of a vehicle bodywork preventive protection application, the moving object is a moving vehicle which maneuvers within the environment of the vehicle of the invention, in particular to park around the vehicle of the invention.

The optical of the asynchronous camera is directed toward the outside environment in order to monitor the outside environment of the vehicle. The asynchronous camera can comprise several asynchronous optical devices located at different points of the vehicle, for example one device having its optic directed toward the front of the vehicle and another device whose optic is directed toward the rear of the vehicle.

The computer which is woken up in the computer wake-up step 12 is a vehicle lighting computer and/or a sound warning computer and/or an obstacle detection computer.

That allows the driver of the moving vehicle to be alerted in the case of a short distance relative to the vehicle and/or to have a better visibility to perform his or her maneuver and/or to benefit from the distance measurement by ultrasound sensors of the vehicle of the invention to assess the distance between the vehicle of the invention and the moving vehicle. The distance information can be communicated to the moving vehicle by a lighting frequency that increases, then becomes fixed below a certain distance. The moving vehicle thus benefits from the distance measurement even in the case where his or her vehicle is not equipped with ultrasound sensors. The distance information can be communicated to the moving vehicle by lighting the direction indicators. The driver of the moving vehicle thus benefits from the lighting of the vehicle of the invention to perform his or her maneuver.

In the case of a monitoring video application, the moving object can be of any kind.

The optic of the asynchronous camera is directed toward the outside environment in order to monitor the outside environment of the vehicle.

The computer which is woken up in the computer wake-up step 12 is a video recording computer.

In the case of a vehicle theft protection application, the moving object is the ground on which the vehicle is parked.

In fact, within the reference frame of the vehicle and therefore of the monitoring system, a movement of the vehicle by lifting or towing corresponds to a motion detection of the ground.

The motor vehicle is parked on a parking surface substantially defining a parking plane. The optic of the asynchronous camera is advantageously oriented toward the parking plane and directed toward the outside of the vehicle.

The vehicle, during its movement, is still considered to be parked within the meaning of the invention. It is its parking surface which moves. The movement between the vehicle and the ground is a relative movement.

The computer which is woken up in the computer wake-up step 12 is a video recording computer and/or a vehicle geolocation computer and/or a vehicle alarm computer.

Figure 3:
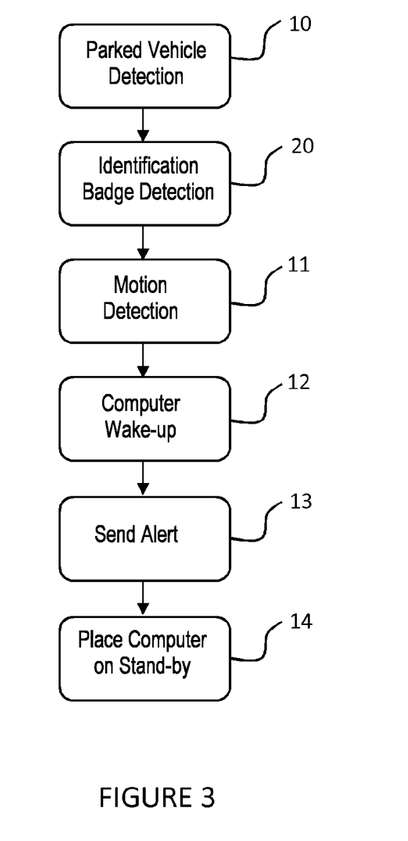

In the case of applications of locking and unlocking the locks of the openings, of mechanical opening of the openings, motorized opening and closing of the openings, the vehicle is associated with an identification badge and the monitoring method also comprises an identification badge detection step 20, as illustrated in FIG. 3.

The identification badge protection step 20 is, for example, the reception by the monitoring system of information transmitted by a communication network of LIN, CAN or Ethernet type.

The optic of the asynchronous camera is directed toward the outside environment of the vehicle.

The moving object is, for example, the hand of an individual, located in proximity to an opening of the vehicle, the individual being the wearer of the identification badge associated with the vehicle.

The moving object can be the gesture of an individual.

In the advanced embodiment, the recognition of the gesture of an individual can be performed during the determination operation 112 of the motion detection step 11, according to FIG. 3 combined with FIG. 2.

Figure 4:
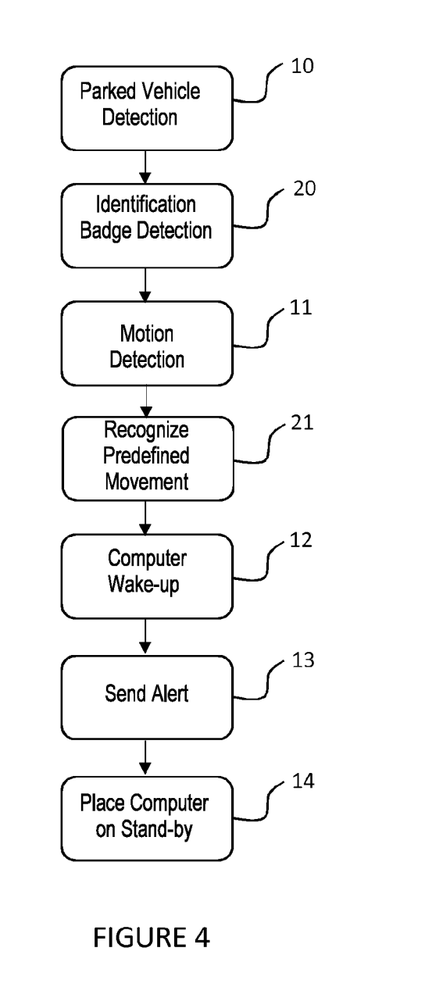

In the basic embodiment, the monitoring method also comprises a step of recognition of a motion of the moving object 21 from among predefined movements, as illustrated in FIG. 4.

A predefined movement corresponds to a line of movement and/or a direction of a movement and/or a speed of a movement.

The computer which is woken up in the computer wake-up step 112 is a vehicle openings computer.

In the application of locking and unlocking of the locks of the openings, the waking up of the computer activates the locking or the unlocking of one or more openings of the vehicle.

In the application of mechanical opening of the openings, the waking up of the computer activates the opening of one or more openings of the vehicle.

In the application of motorized opening and closing of the openings, the waking up of the computer activates the opening or the closing of one or more motorized openings of the vehicle.

The vehicle openings comprise the doors, the bonnet, the trunk lid, the tailgate, the fuel hatch, the charging hatch of an electric or hybrid vehicle, the opening roof of the vehicle, the roof of a convertible.

In the case of an application of prevention of movement of the vehicle, the moving object is the ground on which the vehicle is parked. In fact, in the reference frame of the vehicle and therefore of the monitoring system, a movement of the vehicle corresponds to a motion detection of the ground, for example because of a loose parking brake or of a moving vehicle pushing the parked vehicle.

The motor vehicle is parked on a parking surface substantially defining a parking plane. The optic of the asynchronous camera is advantageously oriented toward the parking plane and directed toward the outside of the vehicle.

During its movement, the vehicle is still considered to be parked within the meaning of the invention. It is the parking surface which moves.

The computer which is woken up in the computer wake-up step 12 is a braking computer.

This application is distinguished for example from the vehicle theft prevention application in that no other moving object is in contact with the vehicle, notably an individual or a vehicle lifting arm.

In the case of a vehicle anti-slip application, the moving object is the ground on which the vehicle is parked. In fact, in the reference frame of the vehicle and therefore of the monitoring system, a movement of the vehicle, for example because a simultaneous slip of all four wheels on a sheet of ice, corresponds to a motion detection of the ground.

The motor vehicle is parked on a parking surface substantially defining a parking plane. The optic of the asynchronous camera is advantageously oriented toward the parking plane and directed toward the outside of the vehicle.

During its displacement, the vehicle is still considered to be parked within the meaning of the invention. It is its parking surface which moves.

The computer which is woken up in the computer wake-up step 12 is a danger warning computer.

This application is distinguished for example from the vehicle anti-theft application in that no other moving object is in contact with the vehicle, notably an individual or a vehicle lifting arm.

Figure 5:
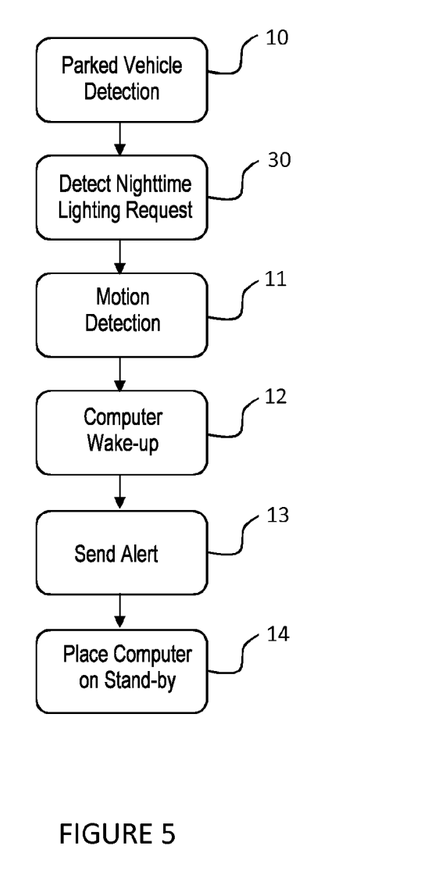

In the case of a vehicle signaling application at night, the monitoring method also comprises a step of detection of a nighttime lighting request signal 30, as illustrated in FIG. 5.

In the step of detection of a nighttime lighting request signal 30, the monitoring system detects the nighttime lighting request by a user of the vehicle, for example by the application of a mechanical or electronic control.

The optic of the asynchronous camera is directed toward the outside environment of the vehicle.

The moving object is for example a moving vehicle traveling on a road on which or close to which the vehicle of the invention is parked.

The computer which is woken up in the computer wake-up step 12 is a vehicle lighting computer.

Thus, the vehicle of the invention parked close to a country road, activates, for example, its side marker lights located on the side of the road, on detection of the approach of a moving vehicle traveling on a road adjacent to its parking surface. The vehicle of the invention indicates its presence only when necessary.

Figure 6:
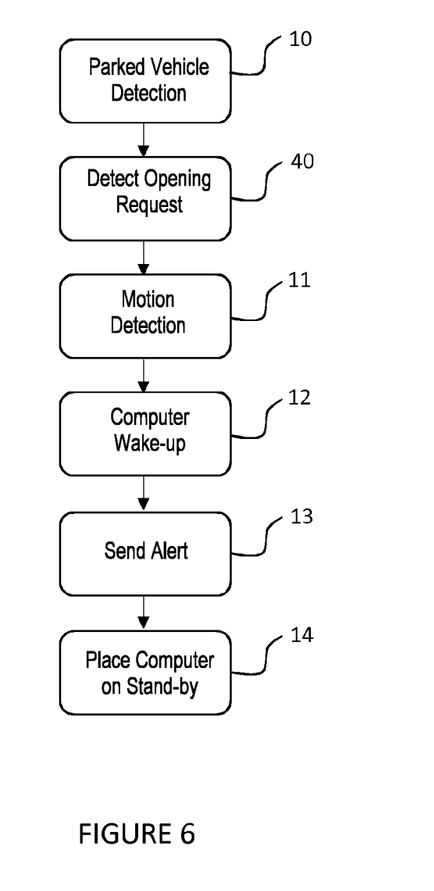

In the case of a secure vehicle exit application, the monitoring method also comprises a step of detection of an opening request of opening 40, as illustrated in FIG. 6.

In the step of detection of an opening request of opening 40, the monitoring system detects that an individual located in the cabin of the vehicle is requesting the opening of an opening, for example by the position of his or her hand on the handle associated with said opening, by pressing on a control button, by the actuation of the handle of said opening, by a gesture recognized by the monitoring system as being an opening request of opening.

The optic of the asynchronous camera is directed toward the outside environment of the vehicle.

The computer which is woken up in the computer wake-up step 12 is a danger warning computer.

For example, a driver who has just parked his or her car and is ready to exit through the driver's side door, is alerted to the risk of collision with a moving vehicle or a cyclist or a pedestrian if he or she opens his or her door.

In the case of an application for lighting the outside environment of the vehicle at night, the moving object is an individual.

The optic of the asynchronous camera is directed toward the outside environment of the vehicle.

The moving object is, for example, the driver traveling in front of vehicle of the invention which is parked.

The computer which is woken up in the computer wake-up step 12 is a vehicle lighting computer.

Thus, the parked vehicle of the invention, activates, for example, its low beams, upon detection of the driver moving away or approaching.

For all the applications, notably the applications listed above, the monitoring system can, in the basic embodiment, wake up a computer without prior recognition of the nature of the moving object. Simply the detection of a moving object in the environment of the vehicle is sufficient.

For all the applications, notably the applications listed above, the waking up of the computer can be performed subject to the recognition of a relevant moving object, notably the recognition of the object type by the synchronous camera and the asynchronous camera. That corresponds to the advanced embodiment.

An image processing filter can also be used. For example, in the case of applications for locking and unlocking openings, of mechanical opening of the openings, of motorized opening and closing of the openings, a moving object at a distance of more than one meter from the asynchronous camera will not be considered as relevant for waking up the vehicle openings computer. Said object will not therefore be considered as a moving object or relevant moving object within the meaning of the invention.

For all the applications, notably the applications listed above, the monitoring method can comprise an alert step 13 wherein the monitoring system sends an alert signal to an electronic device by means of a wireless communication, for example a text or video message to the cellphone of the owner of the vehicle, of the driver of the vehicle, of a passenger of the vehicle or to a monitoring company. Following the reception of this alert, other actions can follow, such as a display of the scene and/or a recording of the scene.

The monitoring system can comprise a computer program product comprising the program instructions implementing one or more monitoring methods whatever the application.

The monitoring system can comprise several computer program products each comprising the program instructions implementing one or more monitoring methods for carrying out at least one of the applications.

The vehicle can comprise several monitoring systems and several computers within the meaning of the invention.

The computer of the vehicle is linked to the monitoring system by a communication system, for example a vehicle communication network of LIN, CAN or Ethernet type.

The monitoring system can receive, process and send communication signals to the computer.

The asynchronous camera can comprise an electronic module making it possible to process the data concerning the detection of moving objects, such as the recognition of the motion of a moving object, the detection of a movement of a moving object, the determination of relevance of a moving object. The electronic module can be remote on an electronic circuit board not incorporated in the asynchronous camera.

In this case, the monitoring system comprises at least one synchronous camera and an electronic module.

When the monitoring system comprises a synchronous camera, the synchronous camera and the asynchronous camera can be connected directly by a communication network or else via a distinct electronic module. The distinct electronic module allows processing of the data concerning the detection of moving objects, such as the recognition of motion of a moving object, the detection of a movement of a moving object, the determination of relevance of a moving object.

A communication system can be wired and/or printed on a printed circuit.

A computer on standby is a computer whose electrical consumption is minimal. The computer is unable to activate its main functionalities but is able to detect a wake-up signal making it possible to wake it up.

A computer that is woken up can activate its main functionalities, for example switch on the side marker lights in the case of a lighting computer.

The invention claimed is:

1. A method for monitoring an environment of a parked vehicle, the vehicle comprising an engine, a computer, and a monitoring system including an asynchronous camera, the monitoring method comprising:
   detecting, via the monitoring system, that the vehicle is parked with the engine being stopped,
   detecting, by the asynchronous camera, a motion in the environment of the vehicle,
   in response to detecting the motion, activating a synchronous camera, and
   determining, via the monitoring system, whether an object is moving in the environment of the vehicle, via data collected by the asynchronous camera and data collected by the synchronous camera.

2. The monitoring method as claimed in claim 1, further comprising sending, via the monitoring system, an alert signal to an electronic device via wireless communication.

3. The monitoring method as claimed in claim 1, wherein the computer is one of:
   a vehicle lighting computer,
   a sound warning computer,
   a vehicle openings computer,
   a vehicle alarm computer,
   an obstacle detection computer,
   a video recording computer,
   a danger warning computer,
   a vehicle geolocation computer, and
   a braking computer.

4. The monitoring method as claimed in claim 1, wherein the vehicle is associated with an identification badge, the monitoring method further comprises detecting the identification badge, and the computer is a vehicle openings computer.

5. The monitoring method as claimed in claim 4, further comprising recognizing a motion of the object from among predefined movements.

6. The monitoring method as claimed in claim 1, wherein the vehicle is parked on a parking surface substantially defining a parking plane, and an optical axis of the asynchronous camera is oriented toward the parking plane.

7. The monitoring method as claimed in claim 1, further comprising placing the computer on standby, wherein the monitoring system places the computer on standby after a predetermined wake-up time of the computer or after a predetermined time of non-detection of a moving object in the vehicle environment has elapsed.

8. A non-transitory computer-readable medium storing a computer program product that, when executed by the computer, causes the computer to execute the monitoring method as claimed in claim 1.

9. The method of claim 1, further comprising in response to determining that the object is moving in the environment of the vehicle, waking up the computer.

10. A monitoring system for monitoring an environment of a parked vehicle, the monitoring system comprising:
    an asynchronous camera;
    a synchronous camera; and
    circuitry configured to detect that the vehicle is parked with the engine being stopped,
    wherein the asynchronous camera is configured to detect a motion in the environment of the vehicle, and in response to detecting the motion, activate the synchronous camera; and
    the circuitry is further configured to determine whether or not an object is moving in the environment of the vehicle using data collected by the asynchronous camera and data collected by the synchronous camera.

* * * * *